United States Patent

[11] 3,574,429

[72] Inventor Paul J. Reising
  Birmingham, Mich.
[21] Appl. No. 831,066
[22] Filed June 6, 1969
[45] Patented Apr. 13, 1971
[73] Assignee Lear Siegler, Inc.
  Santa Monica, Calif.

[54] LOW FRICTION BEARING AND METHOD FOR MAKING SAME
  22 Claims, 3 Drawing Figs.

[52] U.S. Cl. .................................................. 308/238,
  264/54, 161/159
[51] Int. Cl. ..................................................... F16c 27/00,
  B29d 7/20, E06b 3/92
[50] Field of Search .......................................... 308/238,
  237; 264/54, 45; 260/2.5 (E), 2.5 (M); 161/89, 159

[56] References Cited
UNITED STATES PATENTS

| | | | |
|---|---|---|---|
| 3,151,015 | 9/1964 | Griffith | 308/238 |
| 3,193,438 | 7/1965 | Schafer | 161/89 |
| 3,400,988 | 9/1968 | Hudson et al. | 308/238 |
| 3,407,249 | 10/1968 | Landi | 260/2.5M |
| 3,471,419 | 10/1969 | Ehrlich | 260/2.5 |
| 3,193,441 | 7/1965 | Schafer | 161/159 |

Primary Examiner—Frederick L. Matteson
Assistant Examiner—Wesley S. Ratliff, Jr.
Attorney—Barnard, McGlynn and Reising ABSTRACT: In accordance with the invention a bearing is provided with a low friction slide surface which is formed of an open-celled resin foam impregnated with another resin, one of the resins being of relatively high lubricity, preferably polytetrafluorethylene, and the other being a resin of greater strength and hardness, the foam being sufficiently filled and compressed to provide a slide surface of high density.

PATENTED APR 13 1971  3,574,429

INVENTOR
Paul J. Reising
BY
Barnard, McGlynn & Reising
ATTORNEYS

LOW FRICTION BEARING AND METHOD FOR MAKING SAME

This invention relates to a low friction bearing, and method for making same, wherein the low friction surface of the bearing is a dense composite of a resin foam impregnated with another resin thereby providing a combination of excellent properties of high load carrying capacity, wear resistance and lubricity.

Self-lubricating bearings having surfaces formed of a combination of two or more organic resins are well known in the art. To provide the lubricity, polytetrafluorethylene (sometimes herein referred to as "Teflon") is the commonly used resin and, in order to provide greater load-carrying capacity and other useful properties, the polytetrafluorethylene is used as a additive to or in combination with organic resins of higher strength and hardness such as phenolic resin. For example, it is known to mix polytetrafluorethylene powder or flock with other resins and then mold or otherwise form the bearing surface from this mixture. Particularly where flock is used as the additive, good bearings can be and are manufactured using such a mixture; however, such bearings do not meet the high standards required for many self-lubricating bearing applications as, for example, where the application is one where very high loads are encountered. In order to attain the necessary strength and load-carrying capacity even for bearing applications where lesser loads are encountered, it is necessary that the amount of polytetrafluorethylene powder or flock mixed into and dispersed through the other resin not be large since with increase in the amount of polytetrafluorethylene, there is decrease in strength.

The best and at present the most commonly used composite resin self-lubricating bearing surface comprises woven cloth having at least its upper or slide surface formed predominantly if not entirely of threads of polytetrafluorethylene, such cloth being embedded in and bonded to the bearing by a hard resin which penetrates the interstices of the cloth and serves as a matrix. Such bearings are excellent both in their lubricity and their ability to take high static and dynamic loads without excessive wear. However, they are relatively expensive chiefly because polytetrafluorethylene cloth is expensive.

It is an object of the present invention to provide a self-lubricating bearing having a composite resin slide surface which has excellent lubricity, load-carrying capacity and other desirable properties but which is relatively inexpensive. Another and attendant object of the invention is the provision of an improved method for manufacturing such bearings.

Briefly, these objects are accomplished in accordance with the preferred embodiments of the invention, by a bearing wherein the low friction surface comprises an open-celled resin foam impregnated with another resin. In one embodiment the open-celled foam is of polytetrafluorethylene and is impregnated with a harder and stronger resin such as phenol-formaldehyde. In another embodiment the open-celled foam is of a resin which enhances strength and which is impregnated with polytetrafluorethylene or other resin of high lubricity such that the composite structure and composition provides the composite of physical properties required. In one particular embodiment which has the significant additional useful property of extremely high heat resistance, the bearing surface comprises open-celled polyimide resin foam impregnated with polytetrafluorethylene. In still other embodiments, the open-celled resin foam, for example polyurethane foam, functions as a carrier for the lubricative resin and is filled with other resin of greater hardness and strength.

By the term "foam" as used herein is meant a porous cellular or spongelike structure, and, though one common method of manufacturing such structure is by mixing the resin with a blowing agent and allowing it to expand or by frothing air into the resin or an emulsion thereof to form the foam, it is not intended that the term "foam" as used herein be limited to cellular or spongelike resin structures made in such manner.

The resin foam for the practice of the present invention can be manufactured by the aforesaid techniques involving the use of a blowing agent or frothing, or can also be manufactured by other techniques. For example, another technique which is commonly used is to mix the resin with another resin or other material which, after molding, extruding or otherwise forming the mixture into a solid body, can be vaporized or burned out so as to provide the desired open-celled resin foam. By "open-celled" is meant that substantially all of the cells or pores communicate with other of the cells or pores such that there can be complete impregnation of the foam with another resin with substantially no voids remaining.

Open-celled resin foams can be made to any of a wide variety of porosities or cell sizes. For example, open-celled polyurethane foam can be manufactured and is available in wide variety of cell sizes reaching all the way from extremely small cell size, as would be desirable for a filter element, to cell sizes considerably larger and with the cell walls being such as to give the foam the appearance of an integral network of threads or filaments. Likewise, open-celled polytetrafluorethylene foam can be manufactured to various cell sizes. One technique for manufacturing polytetrafluorethylene foam is to mix polytetrafluorethylene with another resin which vaporizes at lower than the sintering temperature of the polytetrafluorethylene and then, after forming a body of the mixture, heating the mixture to the sintering temperature of the polytetrafluorethylene whereby the open-celled porous structure results from the vaporization of the other resin included in the mixture. Hence, the polytetrafluorethylene foam can be manufactured to any of various cell or pore sizes, the size depending upon the amount of vaporizable resin included in the mixture.

The most desirable cell size and porosity for the foam used in the practice of the present invention will depend upon the precise combination of physical properties desired in the final bearing surface manufactured. For example, where the liner is polytetrafluorethylene foam impregnated with phenolic or other hard thermosetting resin, the more open-celled or porous the foam, the greater the amount of hard resin on the final bearing surface, and throughout the structure, so as to provide maximum load-carrying capacity.

Using any given resin foam, in order to provide the highest load-carrying capacity and wear resistance the impregnated foam should have high density and this can be accomplished by completely filling the open cells or interstices of a thin sheet of the foam with the other resin or, preferably, by highly compressing the resin impregnated thin sheet of foam to further and permanently reduce its thickness. The compressing operation will generally always be desirable, even where the foam is substantially saturated with the other resin, since the compression assures the desired high density and provides improved properties.

Other objects, advantages and features of the invention will appear more clearly from the following further description of the invention made in part with reference to the drawings in which.

Figure 1:
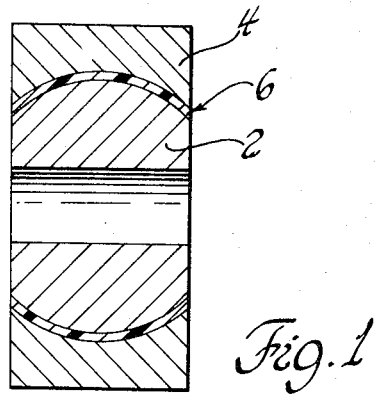
FIG. 1 is a sectional view of a spherical or self-aligning type bearing embodying the invention.

Referring now to FIG. 1 the bearing shown comprises a truncated and bored metal ball member 2 and an outer annular metal race 4 having bonded thereto a low friction liner 6 which is in closely mated sliding engagement with the ball member. In accordance with the present invention, the liner 6 comprises a dense layer of open-celled resin foam impregnated with another resin. One of the resins, either that of which the foam is made or that with which it is impregnated, has relatively high inherent lubricity, preferably polytetrafluorethylene, and the other resin provides high strength and hence good load-carrying capacity and wear resistance. Hence, the liner 6 comprises a dense composite of two interlocked continuous resin phases of irregular shape, one of which is, as compared to the other, relatively soft and of high inherent lubricity, the other phase is of a harder resin of great strength and load-carrying capacity as compared with the soft resin phase.

To manufacture the bearing shown in FIG. 1, a thin layer of open-celled compressible and flexible resin foam is impregnated with another resin and a strip of this composite is then bonded by a suitable adhesive to the interior cylindrical surface of a cylindrical metal member, the length of the strip being such that the ends thereof abut each other when bonded into the cylinder. Then the metal cylinder is swaged to spherical shape around the ball member in accordance with any of the conventional swaging techniques well known in the spherical bearing art, after which the outer surface of the swaged member is machined to cylindrical shape and the edge surfaces machined to the desired shape thereby resulting in the race member as shown at 4 in FIG. 1. Where one of the resins of the composite is a thermosetting resin, as is much preferred, such resin should be in its uncured or B stage, and hence flexible, prior and during the swaging operation and, after the swaging is complete, the swaged assembly is then heated sufficiently to fully cure the thermosetting resin.

The following specific example will serve to illustrate.

A sheet of open-celled polytetrafluorethylene foam having a porosity of about 50 percent and a thickness of about 0.0020 inch is placed on a flat surface and a viscous liquid dispersion of A stage phenol-formaldehyde (approximately 60 percent solids in wood alcohol or the like solvent) is applied to the surface of the foam sheet and knifed into the pores until the phenol-formaldehyde extends completely through to the underside of the foam sheet. After a short drying time the phenol-formaldehyde is amply tacky to resist flow and the sheet can be hung for B staging of the resin in a heating chamber. To B stage the resin the impregnated sheet can be heated to a temperature of 120° F. for about one-half hour to 1 hour at which point the phenol-formaldehyde resin is quite solid but the sheet remains amply flexible for cutting and shaping of the strips therefrom. During or subsequent to this B staging operation the resin impregnated foam sheet can be compressed by application of pressure, as by a platen or by passing it between rollers, so as to reduce the thickness and increase density. A strip is cut from the sheet of a width and length to cover the inside diameter of the metal cylinder which is to become the race member. Preferably the interior surface of the metal cylinder is provided with a thin coating 12 of the phenol-formaldehyde prior to lining it with the phenol-formaldehyde Teflon foam. By having the thin layer of phenol-formaldehyde on the interior surface of the race in a tacky form, the resin impregnated foam lining can be sufficiently secured or bonded to the metal cylinder for easy handling prior to swaging. The metal cylinder lined with the resin impregnated Teflon foam is then swaged around the inner ball member. During this swaging, due to the pressure thereby applied, the resin impregnated Teflon foam liner can be compressed to further reduce the thickness thereof with resultant compaction or compression of the liner to high density. The swaged assembly is then placed in an oven and heated to about 350° to 375° F. for from 6 to 10 hours to thereby fully cure the phenol-formaldehyde resin to its C stage, the precise heating time depending upon the curing temperature used—the lower the curing temperature, the longer the time required. After the curing operation the swaged outer member is machined, as aforesaid, to a cylindrical outer surface and to the desired edge surfaces.

Figure 2:
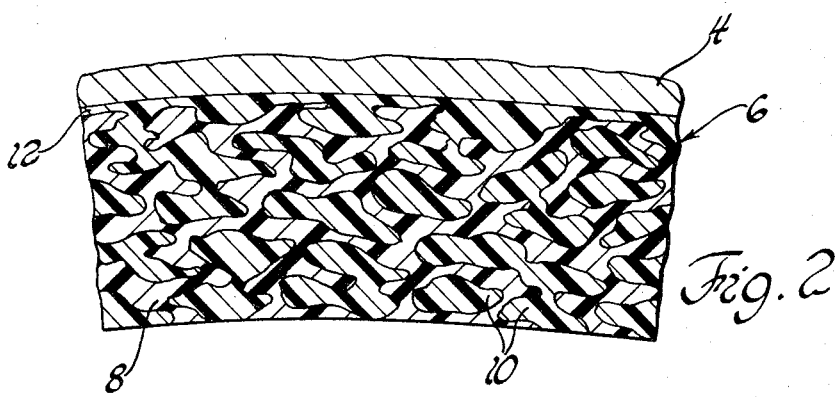
FIG. 2 is a sectional view, in enlarged scale, of the low friction liner of the bearing shown in FIG. 1.

The liner of the completed bearing is illustrated, in enlarged scale in FIG. 2, the polytetrafluorethylene foam being shown at 8 and the phenolic resin phase being shown at 10.

Metal-backed journal bushings having the composite liner can be made in much the same manner though, of course, without need for the swaging operation. This is, a metal cylinder having a thin inner coating a A stage or lightly B staged phenol-formaldehyde resin can be lined with a suitably sized strip of the B staged phenol-formaldehyde impregnated Teflon foam sheet and the lined cylinder placed on an expansible mandrel. With the lined cylinder on the expansible mandrel, the assembly is heated sufficiently and for a sufficient period to fully cure the phenol-formaldehyde resin to its C stage, the liner being compressed during the curing by reason of the expansion of the expansible mandrel. After the curing operation the lined bushings can be removed from the mandrel and any desired machining operation performed.

To make a resin-backed bushing, a strip of the resin impregnated Teflon foam can be wrapped around a mandrel which can then be placed in a suitably sized and shaped mold cavity and phenol-formaldehyde or other resin molded, under pressure, around and against the wrapped strip and the resin then cured to its C stage.

It will be understood, of course, that resins other than phenol-formaldehyde may be used for the impregnation of the Teflon foam. Typical examples are alkyd, melamine, epoxy and polyimide resin, the latter having the marked characteristic of extremely high temperature resistance equaling or exceeding that of the polytetrafluorethylene. Further, it should be understood that various additives can be used for the resin, for example graphite. Still further, and as is well known in the art, whereas polytetrafluorethylene is preferable to other resins as regards high lubricity, nevertheless other resins of high lubricity, such as other of the fluorocarbon resins, can be used if desired. Polymonochlorotrifluorethylene is an example. Also, and as indicated above, the polyimide resins such as that sold by duPont de Nemours of Wilmington, Del. under the trademark "Vespel" has relatively good lubricity as compared with most other resins.

In all of the above examples the open-celled foam provides the relatively soft resin lubricative phase of the composite and the impregnant resin provides the high strength and hardness for good load-carrying capacity and wear resistance. For many if not most bearing applications, however, the reverse is desirable to afford greater cost reduction. That is, in many applications it will prove desirable, particularly from a cost standpoint, to use an inexpensive open-celled resin foam which is impregnated with polytetrafluorethylene or other highly lubricative resin. In many instances the inexpensive open-celled resin foam, rather than functioning primarily as the strength and wear resistance contributing phase, can function as the carrier for the lubricative resin phase and, additionally, has a strength contributing reinforcement for the strong, hard nonlubricative resin phase. The following examples will serve to illustrate, it being understood that once the composite resin impregnated resin foam is formed, it can be shaped into suitable bearing liners, bonded to a backing member, and the remaining manufacturing steps to make the final bearings can be as described above.

Figure 3:
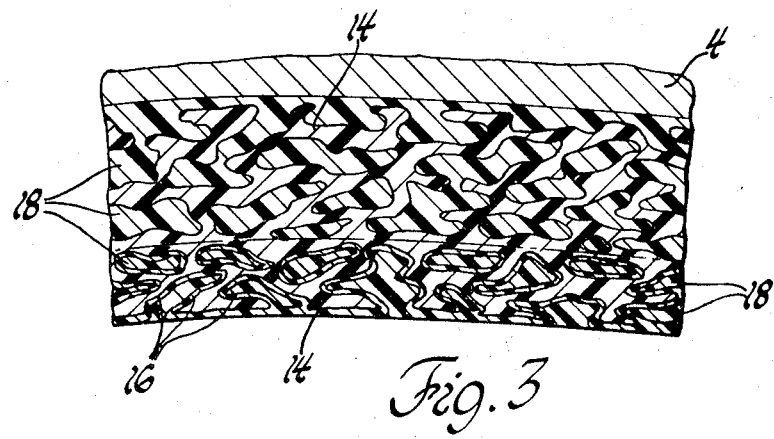
FIG. 3 is a sectional view, in enlarged scale, of the low friction liner and backing of another embodiment of the invention.

One surface of a sheet of open-celled polyurethane foam having about an 80 percent porosity can be sprayed with Teflon emulsion which is then allowed to dry. If desired, additional such coatings of the Teflon can be applied to attain the content of Teflon desired on the face of the foam. The Teflon coats the walls of the foam cells. Then phenol-formaldehyde resin in its A stage viscous form, as described above, can be applied to the other side of the sheet of polyurethane foam and knifed into the foam until it extends all the way therethrough and substantially fills the interstices. After B staging the phenol-formaldehyde resin as described above, the sheet material can then be cut into strips or otherwise shaped and formed to provide the desired bearing liners, and the bearings manufactured as described above. Such a liner is illustrated in FIG. 3, the polyurethane foam being shown at 14, the sprayed on polytetrafluorethylene phase being shown at 16 and the phenolic resin phase being shown at 18.

Since polyurethane and other relatively flexible and compressible open-celled foam bodies can be manufactured inexpensively in any of numerous shapes and sizes, it will, for many applications, prove desirable to start not with the open-celled foam in sheet form but rather in a form which is of the same or approximates the shape of the final desired bearing liner. For example, for cylindrical liners, tube stock of open-celled resin foam could be used, the Teflon being applied to the interior of the tube and the phenol-formaldehyde or other resin being applied to the exterior after which the composite liners can be cut from the resulting composite tube stock.

Instead of applying the Teflon in emulsion form it can be applied in powder or flock form if desired. For example, a sheet of open-celled polyurethane foam can be impregnated with phenol-formaldehyde resin by applying the resin to one side of the sheet and knifing it through as aforesaid after which a thin layer of polytetrafluorethylene flock can be applied to the surface of the sheet which is to function as the slide surface, after which the further processing into bearings can be as described above. In this manner the finely divided lubricative resin is embedded in and bonded to the slide surface of the composite.

To manufacture bearings having extremely high heat resistance along with good lubricity and other characteristics, one of the most desirable composites is one of polyimide resin and polytetrafluorethylene resin. This can be accomplished by applying the polytetrafluorethylene to open-celled polyimide resin foam and then bonding the composite to the backing member preferably by the use of a thin layer of additional polyimide resin, or by impregnating open-celled polytetrafluorethylene foam with polyimide resin and bonding the composite to the backing member, again preferably by the use of a thin layer of additional polyimide resin. Where polyimide resin foam is used the polytetrafluorethylene can, if desired, be applied only to the front face or, in other words, that which is to be the slide face of the composite and additional polyimide resin can be applied to the back face for filling the pores and for good bonding with the backing member.

It is known in the art that resin in fiber form, for example, polytetrafluorethylene fibers or threads, possess greater strength and load-carrying capacity than does the resin in sheet or block form. One major contributing factor to the increased strength of the fiber results from the extrusion and stretching thereof which causes molecular reorientation such that the capacity of the resin to take a load is significantly increased. It is within the scope of the present invention to utilize as the open-celled resin foam, a sheet or strip of the foam which has been worked and stretched as by repeatedly pulling it through a dye opening thereby to increase the load-carrying capacity. It is also within the purview of the invention to utilize for manufacture of the composite liner polytetrafluorethylene foam which has been chemically etched by the process which is well known in the art and which is utilized to etch Teflon sheet thereby to increase the bondability thereof to other resins such, for example, as to phenol-formaldehyde. Hence, while the invention has been described in detail only with reference to certain embodiments thereof, it will be understood that various modifications may be made all within the full and intended scope of the claims which follow.

I claim:

1. A bearing element comprising a backing member having secured thereto a low friction slide facing, said facing comprising, throughout its thickness, at least two continuous and interlocked phases of irregular shape and each of a different organic resin, at least one of said phases being of a relatively soft organic resin and another of said phases being of a relatively hard organic resin.

2. A bearing element as set forth in claim 1 wherein one of said phases is polytetrafluorethylene.

3. A bearing element as set forth in claim 1 wherein one of said phases is polytetrafluorethylene and another of said phases is a thermosetting resin.

4. A bearing element as set forth in claim 1 wherein said slide surface has embedded in and bonded thereto finely divided organic resin of good inherent lubricity.

5. A bearing element as set forth in claim 4 wherein said finely divided resin comprises polytetrafluorethylene fibers.

6. A bearing comprising two bearing elements having surfaces in mated slidable engagement with each other, the surface of at least one of said elements being the surface of a low friction facing which is secured to a backing member and which comprises, throughout its thickness, at least two continuous and interlocked phases of irregular shape and each of a different organic resin, at least one of said phases being of a relatively soft organic resin and another of said phases being of a relatively hard organic resin.

7. A bearing as set forth in claim 6 wherein said surface has embedded therein and bonded thereto finely divided organic resin of good inherent lubricity.

8. A bearing element comprising a backing member having a low friction slide facing comprising an open-celled organic resin foam impregnated with at least one other organic resin.

9. A bearing element as set forth in claim 8 wherein said impregnated foam is compressed to high density.

10. A bearing element as set forth in claim 8 wherein one of said resins is relatively soft and of good inherent lubricity and another of said resins is a relatively hard thermosetting resin of lesser inherent lubricity.

11. A bearing element as set forth in claim 8 wherein said foam is of polytetrafluorethylene and said other resin is a thermosetting resin.

12. A bearing element as set forth in claim 8 wherein the cells of said foam are coated with polytetrafluorethylene and filled with another resin.

13. A bearing element as set forth in claim 12 wherein said cells are filled with a thermosetting resin.

14. A bearing element as set forth in claim 8 wherein said impregnated foam has embedded in and bonded to the surface thereof finely divided resin having good inherent lubricity.

15. A bearing element as set forth in claim 14 wherein said finely divided resin comprises fibers of polytetrafluorethylene.

16. A bearing comprising two bearing elements having surfaces in mated slidable engagement with each other, the surface of at least of one of said elements being the surface of a low friction facing which is secured to a backing member and which comprises an open-celled organic resin foam impregnated with at least one other organic resin.

17. A method for manufacturing a bearing element comprising the steps of impregnating an open-celled resin foam with another resin and thereafter compressing said impregnated foam to high density, said impregnated foam being bonded to a member which serves as a backing therefor.

18. A method as set forth in claim 17 where said resin foam is in the form of a thin sheet thereof and wherein said sheet, after impregnation thereof with said other resin, is compressed to high density after being bonded to the member which serves as the backing.

19. A method as set forth in claim 17 wherein said foam is stretched prior to impregnation thereof with said other resin.

20. A method as set forth in claim 17 wherein the cell walls of said foam are first coated with another resin after which said cells are substantially completely filled with another resin.

21. A method as set forth in claim 17 wherein a layer of finely divided resin of good inherent lubricity is embedded in and bonded to the surface of said resin impregnated resin foam.

22. A method as set forth in claim 17 wherein said foam is of polytetrafluorethylene and wherein said foam is chemically etched to roughen the surfaces of the cell walls thereof prior to impregnation of said foam with said other resin.